United States Patent [19]

Malyon

[11] Patent Number: 4,666,287
[45] Date of Patent: May 19, 1987

[54] DOCUMENT COPIERS

[75] Inventor: Brian R. Malyon, Feltham, Great Britain

[73] Assignee: The British Library Board, London, England

[21] Appl. No.: 857,129

[22] Filed: Apr. 29, 1986

Related U.S. Application Data

[63] Continuation-in-part of Ser. No. 682,020, Dec. 17, 1984, abandoned.

[30] Foreign Application Priority Data

Dec. 24, 1983 [GB] United Kingdom ................ 8334477

[51] Int. Cl.$^4$ ............................................ G03G 15/28
[52] U.S. Cl. .......................................... 355/8; 355/11; 355/66; 355/75
[58] Field of Search .................. 355/8, 11, 3 R, 46, 355/66, 75, 77

[56] References Cited

U.S. PATENT DOCUMENTS 4,170,412 10/1979 Grace et al. .......................... 355/11
4,523,837 6/1985 Temple et al. ........................ 355/75

Primary Examiner—Michael L. Gellner
Assistant Examiner—D. Rutledge
Attorney, Agent, or Firm—Gifford, Groh, VanOphem, Sheridan, Sprinkle and Dolgorukov

[57] ABSTRACT

An attachment for converting a moving platen copier into a fixed platen copier, wherein at least part of the moving platen is replaced by a housing (26) having a window scanned by a scanner unit (30) from which strip images, reflected from a document to be copied and which is located against the window, and relayed by reflector means (38, 40), a lens (44) and reflecting device (46) onto the photosensitive surface (22). The scanning unit and reflector means are connected to the drive from the original platen so as to be synchronously driven in a manner which maintains a constant optical path length (FIG. 2).

15 Claims, 6 Drawing Figures

DOCUMENT COPIERS

EARLIER RELATED APPLICATION

This application is a continuation-in-part of application Ser. No. 682,020, filed Dec. 17, 1984.

FIELD OF INVENTION

This invention concerns document copiers commonly referred to as photocopiers. The invention is primarily concerned with moving platen copiers where the document which is to be copied is placed on a tray containing a window through which the document can be viewed by a scanning device located within the body of the machine.

BACKGROUND TO THE INVENTION

Effectively scanning of a document must be performed in two directions at right angles. Typically one of these directions of scanning is achieved by moving the document relative to a fixed scanning device or moving the scanning device relative to a stationary document. In moving platen photocopiers, the document is moved relative to a stationary scanner.

The need for actual scanning in the second perpendicular direction can be obviated in such a photocopier by causing a narrow strip of document perpendicular to the direction of movement of the document to be illuminated or at least exposed to a photosensitive surface which itself is moved relative to the position of the exposed image of the document so that as the document moves so also does the photosensitive surface so that each successive strip of the document is transformed into a corresponding electrostatic strip in the photosensitive surface on which the document is imaged. Typically the photosensitive surface is the external surface of a cylindrical drum which is rotated in synchronism with the movement of the platen so that an electrostatic image of the document is built up on the external surface of the drum.

Moving platen copiers suffer from certain disadvantages not least of which is the need to secure the document which is to be copied securely on the surface of the platen so that the document does not move during movement of the platen. This means that books and delicate documents may well be crushed or damaged and clearly it would be an advantage to provide for fixed platen type copying for all such documents.

It is, therefore an object of the present invention to provide apparatus by which a moving platen copier can be converted into a fixed platen copier.

SUMMARY OF THE INVENTION

According to the present invention an attachment for converting a moving platen copier to a fixed platen copier comprises:

1. A housing adapted to be mounted over the body of the copier in place of some or all of the moving platen.

2. A window within the housing against which a document to be copied can be placed for scanning.

3. Scanning means for illuminating the document and retrieving therefrom reflected light to form an image.

4. Reflector means for diverting reflected light from the document into an optical path, which path includes right angled reflector means and lens means for forming an in-focus image of the illuminated region of the document onto the surface of the photosensitive device located within the copier.

5. Means for moving the scanning means relative to the document and synchronously moving the right angle reflector means to maintain the overall path length constant and, 6. Means attachable to the platen drive for transmitting drive therefrom to the said means for moving the scanning means whereby normal operation of the photocopier will produce corresponding movement of the said scanning means to effect a scanning of a document located against the said window.

The invention thus allows a moving platen copier to be converted to a stationary platen copier by translating the mechanical movement of the document previously required to effect part of the said scanning, into a translation of a scanning means whilst the document remains stationary.

The scanning means typically comprises an elongate lamp and elongate parallel reflector which serves to illuminate a strip of the document through the window and collect light reflected therefrom and reflect same along a path parallel to the surface of the document. The scanner is adapted to be moved parallel to the document so as to expose successive parallel strips of the document through the window so that the strip image projected by the reflector means parallel to the surface of the document is made up of successive different strips of the document as the latter is scanned.

The optical path preferably includes a further plane optical reflecting surface angled relative to the direction of the first reflected beam so as to divert the beam into a corner reflector the purpose of which is to divert the light beam through 180° irrespective of the angle or angular position of the corner reflector into a path which is intercepted by a further corner reflecting type device for diverting the beam through 90° into the body of the copier and onto the photosensitive surface therein.

By moving the first-mentioned corner reflector rearwardly as the first reflector is moved across the document in the opposite direction, so the overall path length between the first reflector and the photosensitive surface in the body of the copier, will remain constant.

According therefore to another aspect of the invention, a method of adapting a moving platen photocopier to a fixed platen copier comprises the steps of:

1. Removing the or part of the moving platen so as to expose the drive mechanism for moving the platen, 2. Fitting over the body of the copier a housing containing an attachment means for engaging the exposed drive means and 3. Adjusting the position of reflecting surfaces and focusing devices along an optical path within the housing so that an in-focus image of a part of a document held against a viewing window located in the housing, is formed on a photosensitive surface within the copier.

According to another aspect of the present invention an attachment incorporating the present invention enables a photocopier to make copies remote from the usual viewing window and to a different scale from that of the original machine. Thus a copier attachment for enabling a photocopier to make copies remote from the normal window of the machine comprises:

1. A housing adapted to be secured over the photocopier in place of at least part of the moving platen thereof, 2. a window within the housing against which a document to be copied can be placed, 3. scanning means for illuminating the window and a document located thereagainst and for forming an image of at least part of the said document, 4. reflector means for diverting light from the document into an optical path which path includes right angled reflector means and lens means for forming an in-focus image of the illuminated document on the photosensitive surface within the copier, and 5. means for moving the scanning means relative to the document in synchronism with movement of the right angle reflector means to maintain the overall path length constant.

The movement of the scanning means and synchronous movement of the right angle reflector means may be achieved by an independent drive operating synchronously with drive means within the copier or advantageously both the scanning means and the synchronously moving right angled reflector means may be driven from drive means within the photocopier and preferably the drive means which is normally used to move the platen.

Where the distance travelled by the scanning means in the housing is the same as the distance which would have been moved by the platen for any particular document to be copied, the size of the document image and therefore the copy thereof will be the same as that which would normally be obtained from the same document when placed on the original platen. On the other hand if the window is a much larger area than the original platen and the scanning means moves from one end to the other in the same time as the photosensitive drum is rotated within the copier, so a reduction in size as between the original document and the final photocopying will be achieved at least in the dimension measured parallel to the direction of movement of the scanning means in the housing.

If the optical path includes lens means which reduces the image applied to it by an appropriate amount, the width of the image presented to the photosensitive surface in the copier will also be reduced and this can be to the same amount as the demagnification in the perpendicular direction or if desired, to a greater or lesser extent.

In a similar manner an enlargement can be obtained by using magnifying optics in the path so that a smaller than normal document is scanned by the scanning means which in turn must be set to move over a smaller distance to accommodate the smaller field of view.

Preferably the scanning means is located behind a transparent glass or plastics window.

The window may face in a generally upwardly or downwardly direction and may be inclined which latter is to advantage where a scanning head is required for entry into a partially opened book to allow one of the pages at which the book is open to be scanned.

There is a particular advantage in providing a downwardly facing window since this enables a document to be offered up to the window in the same attitude as it is normally viewed by the operator and if the document is itself supported on a platform immediately below the window, the operation of for example photocopying the different pages of a book can be greatly simplified as compared with the normal procedure since the book can be rested on the platen below the window, and opened to each page in turn and simply offered up to the window for copying. Contrast this with the normal procedure with a conventional copier where the document must first be viewed and checked, it must then be turned over (which in the case of a book can result in the binding becoming strained and damaged) and the document or book located over the window with a certain amount of guesswork to ensure that the area of the document or page which is to be copied is correctly located relative to the window.

The invention also lies in a copier when modified by the invention.

BRIEF DESCRIPTION OF THE DRAWINGS

The invention will now described by way of example with reference to the accompanying drawings in which.

DETAILED DESCRIPTION OF PREFERRED EMBODIMENTS OF THE PRESENT INVENTION

Figure 1:
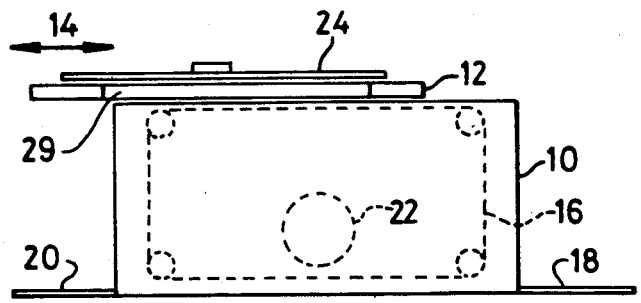
FIG. 1 is a side view of a conventional moving platen copier.

In FIG. 1 there is shown a copier 10 having a platen 12 which can slide in the direction of the arrow 14 across the upper surface of the unit 10 under control of a drive mechanism part of which is shown in dotted outline 16.

A tray containing paper at 18 provides a stock of paper sheets on which copies can be made whilst a second tray 20 collects finished copies.

Within the unit 10 is located a drum also shown in dotted outline at 22 and documents to be copied are laid on the platen, face down, and held in place by a relatively heavy cover 24 normally hinged to the platen. The platen 12 has a window 29 through which a document laid on the platen can be exposed to a light source and the drum 22.

Figure 2:
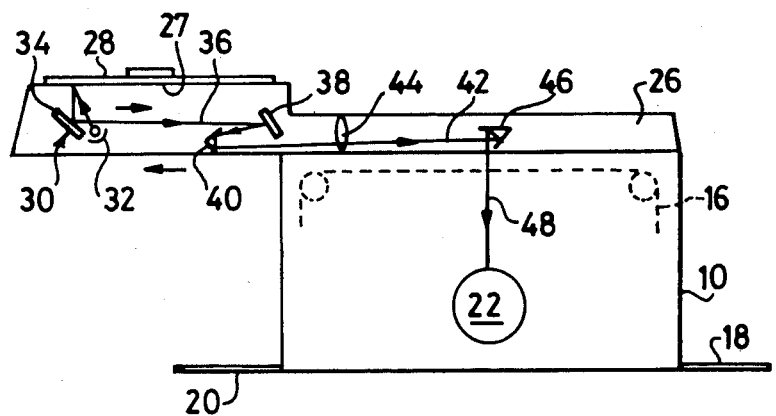
FIG. 2 is a view of the same copier with the moving platen removed and with a housing in accordance with the invention fitted thereto.

In accordance with the invention, the sliding platen 12 and cover 24 are removed thereby exposing the upper track of the drive mechanism 16 and a subsidiary housing 26 shown in FIG. 2 is bolted to the unit 10. A mechanism within the housing 26 is attached to the drive 16 so that a movable member within the housing 26 will move in the same way as the platen 12 moves in a conventional copier shown in FIG. 1.

Typically, the platen drive is similar to that of a typewriter carriage drive. The movable platen runs in a shallow guide and is moved by means of a connecting wire attached to a spring loaded reel driven by a motor drive. Upon removal of the movable platen 12, the housing 26 is secured to the unit 10 and a movable scanner unit 30, having runners which cooperate with the shallow guide of the unit 10, is mounted to the drive utilizing the mechanism found in the unit. Thereafter, the drive wire is connected to a fitting on the scanner unit 30 in order to drivably move the scanner. The scanning unit 30 of the attachment 26 will then be driven within the housing 26 in a manner similar to the original movable platen. Alternatively, other types of drives may be employed such as endless belt drives. However, whatever type of drive is utilized in the original unit, the movable scanner 30 in the attachment of the present invention is designed to cooperate with the original drive of the copier.

The drum 22 remains as before.

The housing 26 extends to one side of the unit 10 and provides a window 27 normally covered by a cover 28 similar to the cover 24 of FIG. 1, on which documents which are to be copied can be laid and held in place by the cover 28. The window 27 covered by the cover 28 is scanned by an elongate scanner unit 30 containing a lamp and reflector unit 32 and a plane inclined mirror 34.

The power source normally used by the original optical system of the moving platen copier, including the original light source, is disconnected from the optical system and is connected instead to the lamp unit 32 in order to provide power to the lamp unit 32. Since the original optical system is no longer operational, light from this system will not expose the photosensitive material utilized in the process.

Alternatively a separate power source may be provided for the lamp unit 32. The original optical system may then be left operational provided that the photosensitive material is protected from exposure by it. The housing 26 may have means to block off the light from the original optical system, and its interior may be matt black to prevent reflection of light from the original optical system to the photosensitive material.

The light from the lamp unit 32 serves to illuminate a narrow strip of a document located above the window 35 and light reflected back from the strip is diverted by the plane mirror 34 along a path 36 to a second plane mirror 38. This diverts light into a right-angle corner reflector 40, which diverts the light by 180°. The light then passes along a path 42 through a lens 44 to a further corner reflector 46 by which it is deflected along path 48 to the drum 22. The power of the lens 44 and position of same is chosen so that an in-focus image of the narrow strip of illuminated document is formed on the surface of the drum 22.

The corner reflector 40 is linked to the unit 30 so that movement of one produces corresponding movement of the other so that the overall optical path length between the mirror 34 and the surface of the drum 22 remains constant irrespective of the positions of the scanner unit 30 and the corner reflector 40.

The scanner unit 30 is driven by the drive means (not shown) within the housing 26 which is linked to the drive 16 so that by causing the copier 10 to operate normally, paper is automatically drawn into the machine in manner known per se, and movement of the drive 16 produces corresponding movement of the elongate unit 30 relative to the document so as to effectively scan the same and the overall optical image is formed on the drum 22 to form electrostatic pattern thereon in manner known per se. The electrostatic charge pattern is applied to the paper as it passes through the machine and an electrostatic image is inverted into an ordinary black and white image by application of toner powder and the image is fixed thereon in manner known per se typically by heated and pressure rollers so that a true copy is ejected onto the tray 20. The drive mechanism 16 normally includes a cycle to return the platen 12 (when fitted) to a home position and in consequence the scanning unit 30 will be returned to its home position shown in FIG. 2 at the end of each scan.

In addition, the movable scanner unit includes transmission means which, when the light source 32 is driven in one direction, drives the corner reflector 40 in the opposite direction thereby maintaining constant the length of the optical path to the imaging lens 44.

Figure 3:
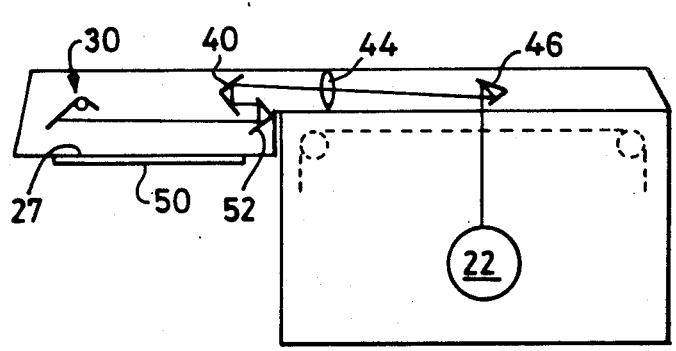
FIG. 3 is a similar view to that of FIG. 2 with a modified housing incorporating the invention fitted to the copier.

FIG. 3 shows a similar arrangement to that of FIG. 2 in which the window 27 in the housing is located on the underside of the section which overhangs the unit 10 so that a document can in fact be held under the window 27 by a platform 50 instead of at a position over the top of a window for copying purposes. The housing includes a scanner unit 30, 90° corner reflector 40 and further corner reflector 46 all as in FIG. 2, but the plane mirror 38 of FIG. 2 is replaced by a further corner reflector 52, to form an in-focus strip image on the drum 22.

A degree of proportionality can be provided between the movement of the scanner unit 30 and the movement of the drive mechanism 16, so that larger or smaller documents can be accommodated with consequent adjustment in the optical power of the lens unit 44.

If the window 27 of the housing 26 is not the same size as the window 29 of the original platen 12, the drives for the scanner unit 30 and the moving corner reflector 40 may be derived from the normal platen drive through transmission means having a predetermined path length ratio, said path length ratio being selected to match the comparative window sizes of the window in the housing and the window in the original moving platen.

Figure 4:
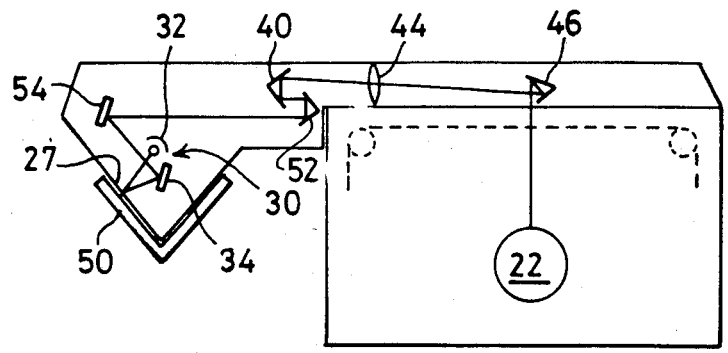
FIG. 4 is a view similar to that of FIG. 2, with a further modified housing incorporating the invention fitted to the copier.

FIG. 4 shows an arrangement similar to FIGS. 2 and 3, in which the window 27 is inclined to the vertical. The parts and the optical system are similar to those of FIG. 3, and like reference numerals are used for like integers. However, since the scanning movement of the scanner unit 30 is not horizontal, a further plane mirror 54 is provided in the optical path to deflect the beam from the mirror 34 of the scanning unit to the corner reflector 53.

Figure 5:
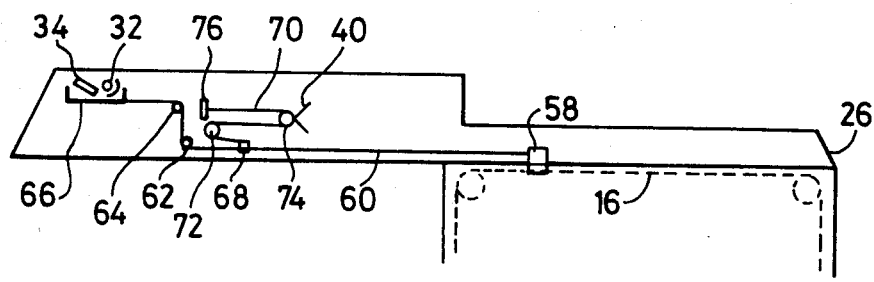
FIG. 5 is a side view of a copier with the housing of FIG. 2 fitted, showing the drive system for the housing.

FIG. 5 shows a drive system for the scanning unit 30 and the corner reflector 40 of FIG. 2. Other optical components are omitted from this Figure for clarity. The drive system 16 of the copier has an attachment means 58, normally used for attachment to the platen 12. A drive wire 60 of the housing 26 is attached to the attachment means 58. The drive wire 60 passes over fixed pulleys 62 and 64 to a carriage 66 of the scanning unit 30 which carries the lamp and reflector unit 30 and the mirror 34. The carriage 66 is biased to the left in FIG. 5. Movement of the attachment means 58 causes corresponding movement of the carriage 66, against or under the influence of its bias according to the direction of movement. Thus the movement of the scanning unit 30 mimics the normal movement of the platen 12.

The drive wire 60 carries a further attachment means 68. A further drive wire 70 is attached to this further attachment means 68. The wire 70 passes around a fixed pulley 72 and a movable pulley 74 to a fixed stop 76. The corner reflector 40 is attached to the movable pulley 74, and is biased to the right in FIG. 5. Movement of the wire 60 and the carriage 66 will result in corresponding movement in the reverse direction of the pulley 74 and corner reflector 40, but at half speed. In this way the length of the optical path in FIG. 2 is maintained constant.

Similar drive systems can be provided for the embodiments of FIGS. 3 and 4.

Figure 6:
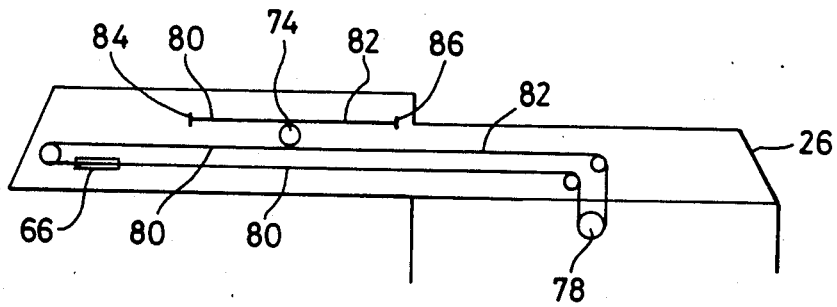
FIG. 6 is a side view similar to FIG. 5, showing an alternative drive system for the housing.

FIG. 6 shows an alternative drive system, which is not dependent on a bias to return the carriage 66 and the movable reflector 40. A drive wire of the housing 26 is passed over a drive capstan 78 of the photocopier drive system. Respective portions 80 and 82 of this wire extend into the housing 26 from respective sides of the capstan 78. Wire portion 80 carries fast with it the carriage 66 of the scanning unit 30. Both wire portions 80, 82 approach the movable pulley 74 which carries the corner reflector 40, from opposite directions, and pass around the pulley 74 through 180° and extend to respective end stops 84, 86.

Rotation of the capstan 78 of the photocopier drive system will shorten one of the wire portions 80, 82 and lengthen the other by equal amounts. The carriage 66 will be moved by the same amount by the wire portion 80. The change in length in the wire portions causes and is accommodated by movement of movable pulley 74. The pulley 74 will move by half the change in length of the wire portions, and thus by half the distance moved by the carriage 66, and will move in the opposite direction to the direction of movement of the carriage 66.

I claim:

1. An attachment for converting a moving platen document copier into a fixed platen copier, comprising
   (1) a housing adapted to be mountable on the body of the copier in place of at least part of the moving platen;
   (2) a window in the housing against which a document to be copied can be placed for scanning;
   (3) scanning means including a light source for illuminating the document and means for retrieving reflected light therefrom and deflecting it into an optical path, which path includes reflector means and lens means for forming an in-focus image of the illuminated region of the document on the surface of a photosensitive device located within the copier;
   (4) means for moving the scanning means relative to the document;
   (5) means linking the reflector means with the scanning means for synchronously moving the reflector means to maintain the overall path length constant; and
   (6) means attachable to the platen drive for transmitting drive therefrom to the said means for moving the scanning means whereby normal operation of the photocopier will produce corresponding movement of the said scanning means to effect a scanning of a document located against the said window.

2. A copier attachment according to claim 1, wherein the reflector means includes at least one corner reflector.

3. A copier attachment according to claim 1, wherein the scanning means comprises an elongate lamp and a parallel elongate reflector for illuminating a strip of the document and reflecting a strip image into the optical path, and the elongate reflector reflects the strip images along a path parallel to the surface of the window, the scanning means being adapted for movement parallel to said path.

4. A copier attachment according to claim 3, wherein the reflector means includes a corner reflector and a fixed second reflector for directing light from the elongate reflector into the corner reflector.

5. A copier attachment according to claim 4, wherein the optical path includes a reflecting device for reflecting the strip images from the corner reflector onto the photosensitive surface, and a lens intermediate the corner reflector and said reflecting device.

6. A copier attachment comprising
   (1) a housing adapted to be secured on the photocopier in place of at least part of the moving platen thereof;
   (2) a window within the housing against which a document to be copied can be placed;
   (3) scanning means for illuminating the window and a document located thereagainst and for forming an image of at least part of the said document;
   (4) reflector means for diverting light from the document into an optical path, which path includes right-angled reflector means and lens means for forming an in-focus image of the illuminated document on the photosensitive surface within the copier; and
   (5) means for moving the scanning means relative to the document in synchronism with movement of the right angle reflector means to maintain the overall path length constant.

7. A copier attachment according to claim 6, wherein both the scanning means and the right angle reflector means are driven from the drive means within the photocopier which is normally used to move the platen.

8. A copier attachment according to claim 7, wherein the drives for the scanning and reflector means are derived from the normal platen drive through transmission means having a predetermined path length ratio, said path length ratio being selected to match the comparative window sizes of the window in the housing and the window in the original moving platen.

9. A copier attachment according to claim 8, wherein the lens means is adjustable for any one of one-to-one copying, enlargement and reduction.

10. A copier attachment according to claim 9 wherein the lens means is capable of effecting a dimensional scaling in one direction bearing a chosen relationship to a dimensional scaling effected in the orthogonal direction by selection of the path length ratio.

11. A copier attachment according to claim 1, wherein the housing window is inclined to the vertical, the attachment including a platform beneath the housing for supporting a document to be located against the inclined window.

12. A copier attachment according to claim 6, wherein the housing window is inclined to the vertical, the attachment including a platform beneath the housing for supporting a document to be located against the inclined window.

13. A copier attachment according to claim 1, wherein the housing window is disposed downwardly facing, the attachment including a platform beneath the housing for supporting documents to be located against the downwardly facing window.

14. A copier attachment according to claim 6, wherein the housing window is disposed downwardly facing, the attachment including a platform beneath the housing for supporting a document to be located against the downwardly facing window.

15. A method of modifying a moving platen copier to form a fixed platen copier which comprises the steps of
   (1) removing at least part of the moving platen so as to expose the drive mechanism for moving the platen;

(2) fitting on the body of the copier a housing containing an attachment means for engaging the exposed drive mechanism; and
(3) adjusting the position of reflecting surfaces and focusing devices along an optical path within the housing so that an in-focus image of at least part of a document, positioned against a viewing window located in the housing, is formed on a photosensitive surface within the copier.

* * * * *